No. 635,099. Patented Oct. 17, 1899.
E. HUBER & J. W. MILLER.
STRAW SELF FEEDER AND BAND CUTTER.
(Application filed Sept. 7, 1898.)
(No Model.) 3 Sheets—Sheet 1.
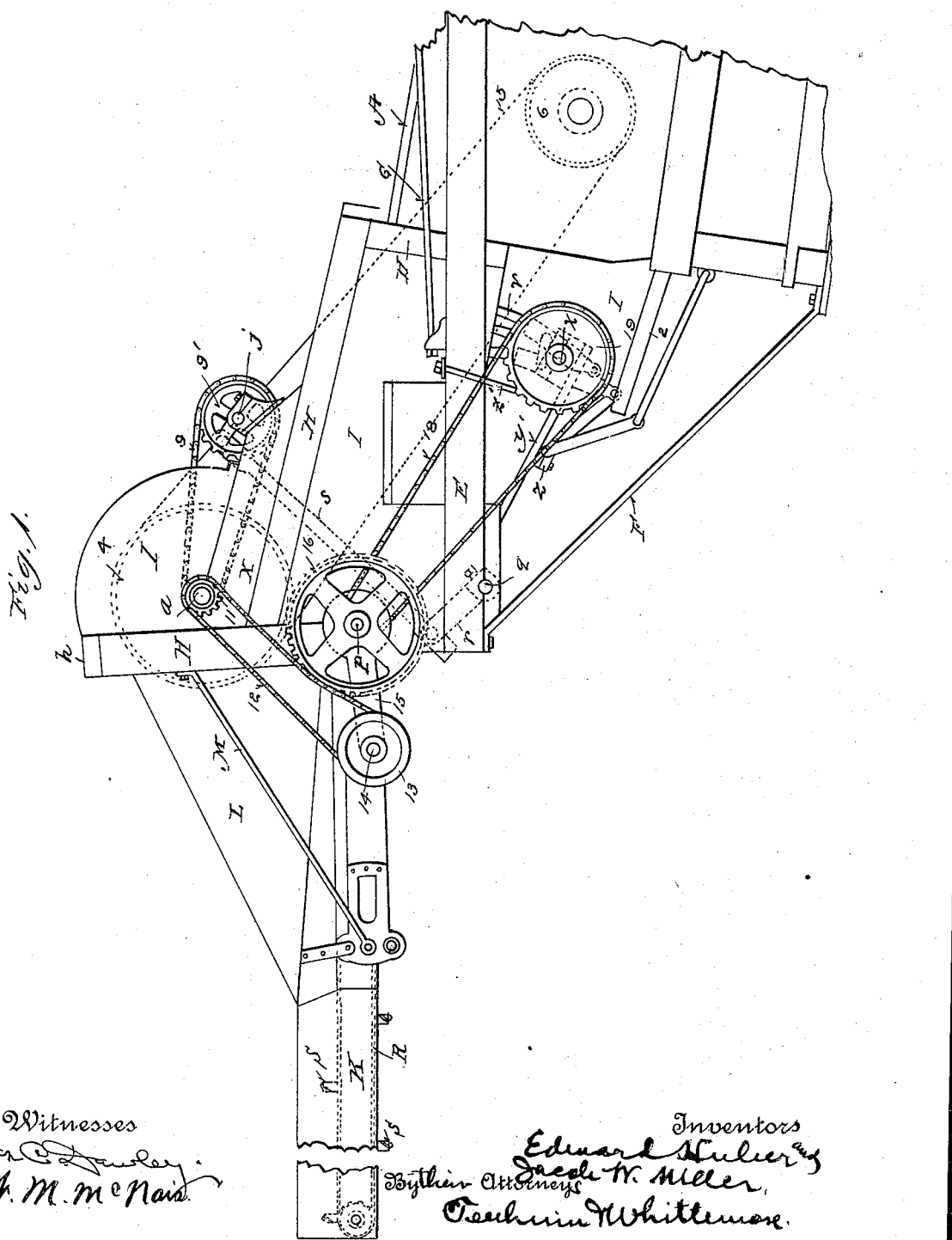

No. 635,099. Patented Oct. 17, 1899.
E. HUBER & J. W. MILLER.
STRAW SELF FEEDER AND BAND CUTTER.
(Application filed Sept. 7, 1898.)
(No Model.) 3 Sheets—Sheet 2.
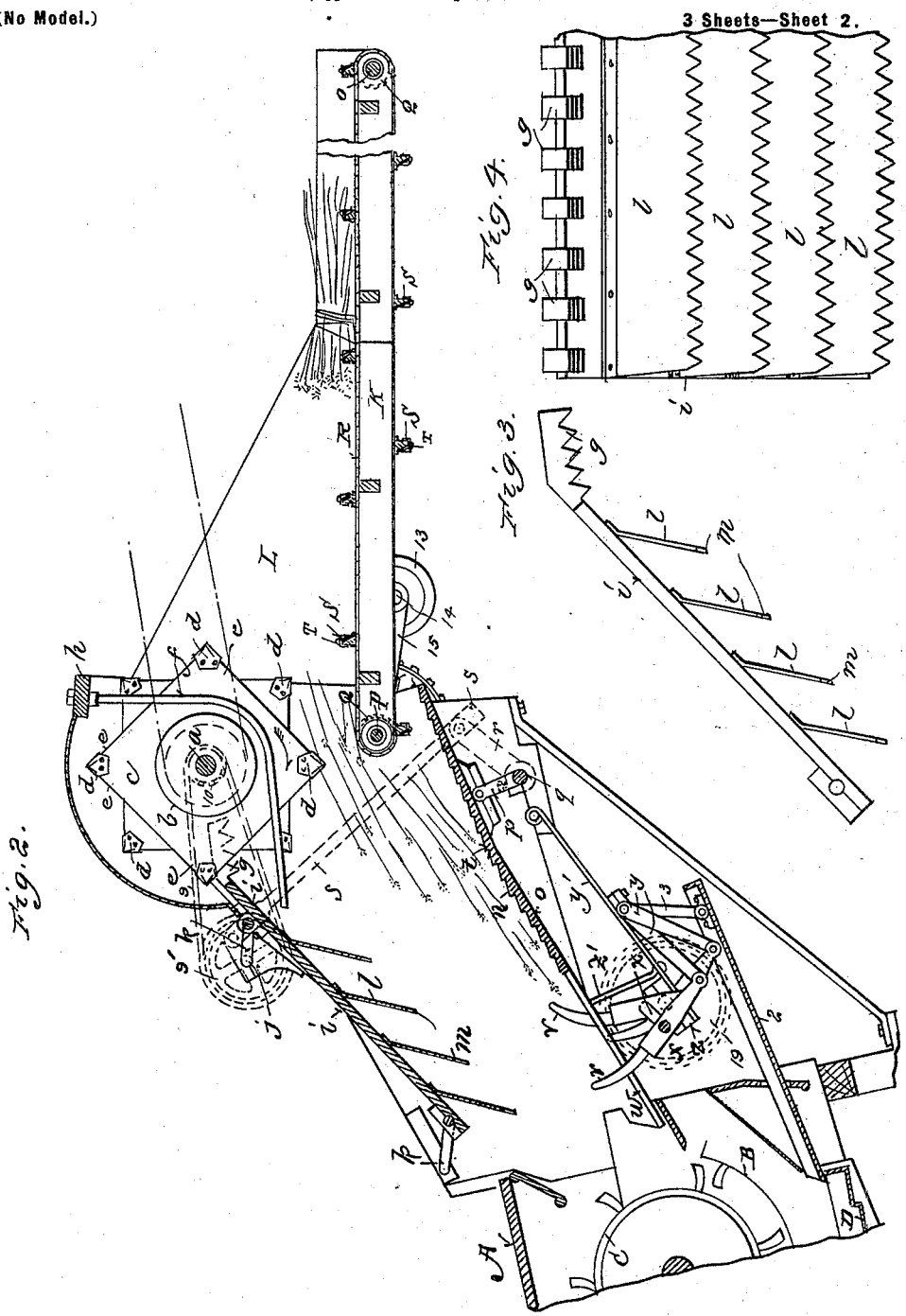

No. 635,099. Patented Oct. 17, 1899.
E. HUBER & J. W. MILLER.
STRAW SELF FEEDER AND BAND CUTTER.
(Application filed Sept. 7, 1898.)
(No Model.) 3 Sheets—Sheet 3.
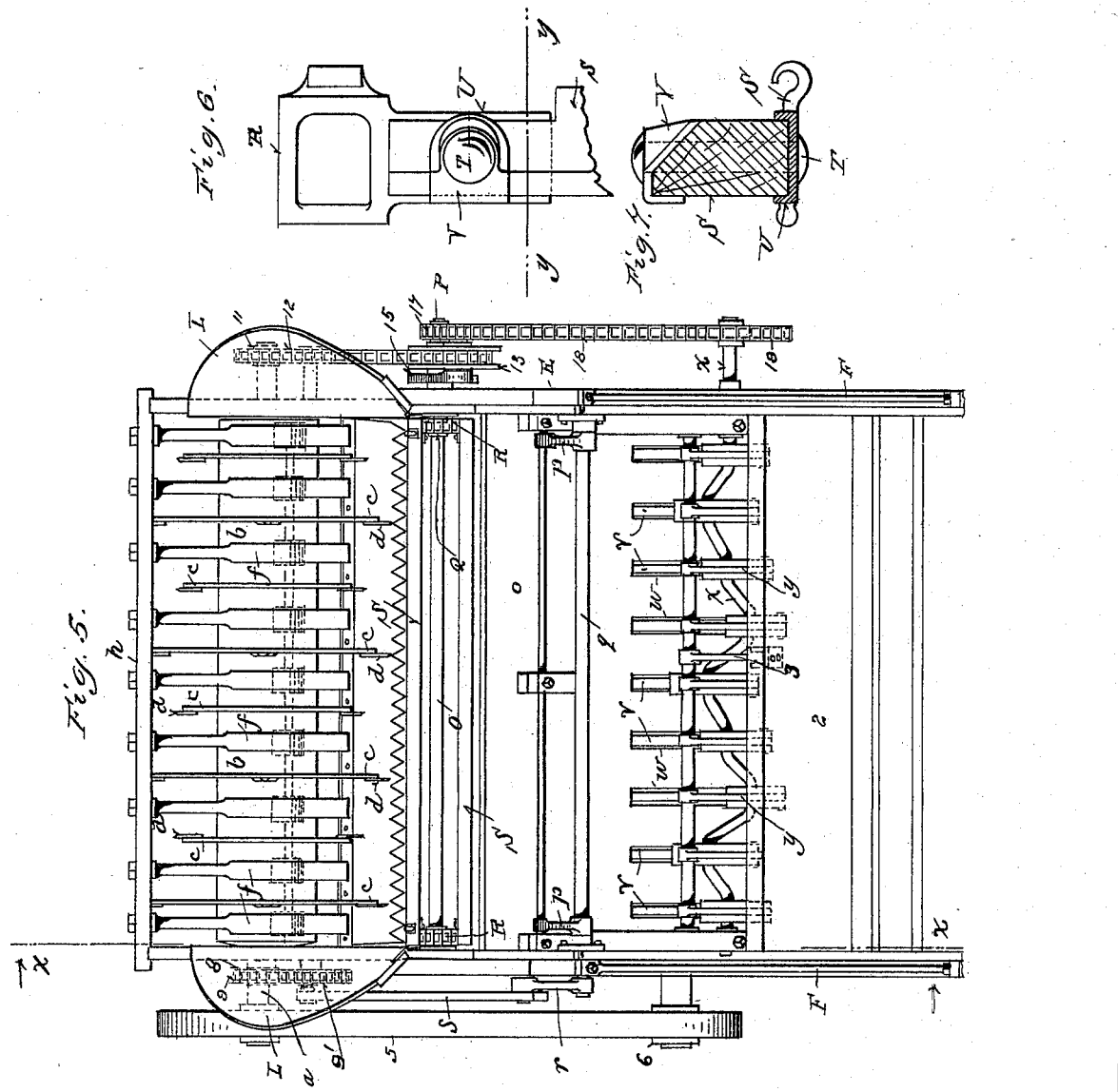
Witnesses
Inventors
By their Attorneys

UNITED STATES PATENT OFFICE.

EDWARD HUBER AND JACOB W. MILLER, OF MARION, OHIO.

STRAW SELF-FEEDER AND BAND-CUTTER.

SPECIFICATION forming part of Letters Patent No. 635,099, dated October 17, 1899.

Application filed September 7, 1898. Serial No. 690,415. (No model.)

*To all whom it may concern:*

Be it known that we, EDWARD HUBER and JACOB W. MILLER, citizens of the United States, residing at Marion, in the county of Marion and State of Ohio, have invented certain new and useful Improvements in Band-Cutters and Feeders, of which the following is a specification, reference being had therein to the accompanying drawings.

This invention relates to certain new and useful improvements in straw self-feeders and band-cutters designed for use in connection with threshing-machines to perform the double function of feeding the bundles of wheat or other straw to the threshing-machine and of cutting the band or twine which binds the straw into bundles.

Our invention comprehends numerous features of organization and construction. Among the more prominent features are: Oscillating hooks which act in conjunction with the band-cutter proper to disengage from the latter such straw as becomes entangled with it and would accumulate on it; an oscillating deflector carrying combs which act to advance the straw through the machine after the bands are cut; a triangular form of blade with cutting edges along both sides, so that by first running the cutter in one direction one set of these edges will cut and by reversing the cutter-head end for end in its bearings the other set of cutting edges will come into play, thus extending the life of the blades; an oscillating pan or floor upon which the grain descends after the bands are cut and by which it is conducted to the threshing-cylinder of the threshing-machine, such pan or floor having two peculiarities—namely, an elevated part from which to the discharge end the pan or floor is steep compared with its inclination from the elevated portion toward the front of the machine, which being less inclined can be extended under the discharge end of the endless carrier or apron, whereby the straw is prevented from getting out of the machine in its passage from the apron to such pan or floor and whereby it passes more rapidly to the thresher by reason of such steeper inclination, due to the elevation of the pan or floor at such intermediate point; an operating mechanism for such pan or floor and such deflector, so that they move in proper unison by being interconnected through this operating means; a certain pan suspended at one end and resting at the other on the oscillating grain-pan of the thresher, so as to receive motion from it, such certain pan being called an "auxiliary" pan and having the function of catching grain that may drop from the floor above it, a peculiar-shaped slat for the carrier, together with a triangular washer and ring, the object of such devices being to more readily catch into the straw bundles or sheaves, and to other minor details, all as hereinafter more fully described, and particularly pointed out in the claims.

In the accompanying drawings, on which like reference letters and numerals indicate corresponding parts, Figure 1 is a side elevation of our machine shown in juxtaposition to the cylinder end of a threshing-machine; Fig. 2, a vertical longitudinal sectional view on the line *x x* of Fig. 5, looking in the direction of the arrow, and showing also in section a part of the threshing-machine; Fig. 3, a detail side elevation of the oscillating deflector with its comb and clearing-hooks; Fig. 4, an inverted plan view of the same parts; Fig. 5, a front elevation of our machine; Fig. 6, a detail plan view of a part of one of the carrier-slats and its washer and wing, and Fig. 7 a sectional view of the same on the line *y y* of Fig. 6.

The letter A designates a part of that end of a threshing-machine into which the straw to be threshed is fed. This end contains a threshing-cylinder B, spiked, as usual, and a threshing-cylinder C, also as usual, together with an oscillating grain-pan D and other minor parts. It is in juxtaposition to this end of such a machine that our feeding and band-cutting machine is placed and to which it is preferably connected by means of the extended beams E, (see Fig. 1,) supported by braces F and truss-rods G. (See Fig. 1.)

Our machine is composed, first, of a general frame H and a general casing I, constructed to be supported by the thresher-beams E and to fit up to the thresher, as shown in Figs. 1 and 2. A carrier-frame, composed of side strips or boards K, widened at L and braced by rods M, is secured to the general frame H, and in such side strips K are journaled shafts O and P, each carrying sprocket-wheels Q, upon which are mounted a pair of sprocket-chains R, armed with carrier-slats S, secured to the links of the sprocket-chain by means of rivets T and fitting within seats U, which are a part of the sprocket-chain links. The upper rear edge of these carrier-strips is chamfered off, and a clip or washer V is fitted thereto and held by the same rivet T.

Approximately above the inner end of the endless carrier thus formed we mount the cutter in proper bearings formed upon blocks X on the general frame H. Such cutter proper consists of a shaft $a$, carrying a roller $b$, carrying at intervals plates $c$, preferably square to form rectangular corners armed with double-edged A-shaped blades $d$, the plates $c$ being set so that such corners of every other plate are in line and the corners of the intermediate plates in line with each other, but the corners of one group being opposite the straight sides of the other group. This construction affords supports for the blades in the nature of radial spokes, but which is stronger and cheaper to make than a spoke-like structure, while at the same time the diverging edges of the plates from the base of the blades constitute a continuation of the cutting edges, as suggested at $e$. This device we term the "cutter" proper, the shaft-plates and roller constituting the head and the blades $d$ the principal cutters. When the blades along one edge become dull, the other edge is brought into play by lifting the head out of its bearing and turning it end for end, its driving sprocket-pinion being transferable from end to end for this purpose, so as to always be in position for the driving-chain, as will appear hereinafter. This cutter proper revolves in the direction of the arrow in Fig. 2, and the blades coming down between the individual straws of the bundles cut the binding twine or band as the bundles pass within range of the blades as they advance toward the threshing-machine by the action of the endless carrier.

To prevent the straw from coming or crowding too much against the roller $b$, a series of bent guards $f$ are secured to the cross-piece $h$ and extended between the plates $c$ and back beyond the cutter. To rake off of the roller such straw as will inevitably wrap around it, we provide a series of oscillating raking or clearing hooks $g$, which are preferably toothed and which extend between the plates $c$ and near to the roller. To give them motion, it is preferred to connect them with or form them on the oscillating deflector $i$, which is a board connected at one end to the crank of a shaft $j$, mounted in bearings on the blocks X, and at the other end to a swinging crank-shaft $k$. When rotary motion is imparted to the shaft $j$ in the direction of the arrow, the oscillating deflector is given a rising-and-falling motion, advancing rearwardly as it falls, and thus causing the raking-hooks to gather the straw from the roller and give it a downward thrust, while the main bulk of the straw is engaged and thrust downward by the inclined feeding-combs $l$, secured to the deflector $i$ and preferably toothed, as shown at $m$. Their operation is very effective in pushing the straw onward, and as they are inclined and are lifted up and away from the straw on their reverse movement they drag back on the straw little or none.

The next feature of our machine is the double-inclined bottom or pan $o$, supported in a manner to permit it to be vibrated by the arms $p$ of the rock-shaft $q$, journaled to the frame beneath such floor. At one end of the shaft $q$ a crank-arm $r$ is attached and operated by a pitman $s$, extending up outside of the casing and connected with the crank part of the shaft $j$, so as to transmit and convert the rotary motion of said shaft into reciprocating motion for the crank $r$ to rock the shaft $q$. This floor $o$ changes the direction of its inclination at the point $t$, so that from thence upward it may extend well under the discharge end of the carrier to prevent loss of straw at that point, and from thence downward it is steeper, so as to more rapidly advance the straw to the thresher. By preference it has serrations or teeth $u$. A series of feeding-fingers $v$ extend up through slots $w$ in this floor and are actuated by a crank-shaft $x$ and guided by links $y$, the shaft receiving motion in a manner hereinafter described and having its bearing-blocks $z$ supported by a bar $y'$ and a rod $z'$; but these fingers and the manner of operating them form no part of our invention, as they are already known; but beneath them there is another part of our invention—namely, a catch-pan 2, suspended by links 3 at one end and resting at the other upon the vibrating or oscillating grain-pan D of the thresher, so as to receive like motion from it. As the floor $o$ is slotted, more or less grain spills out. It is caught by this catch-pan 2, which is beneath the finger mechanism, and is thence delivered into the grain-pan.

We will now refer to the preferred manner of operating the several parts of our machine, referring to the driving power and belting or gearing.

A pulley 4 receives motion by the belt 5 from a pulley 6 on the thresher-cylinder. The pulley 4 is on the shaft $a$. This shaft carries a sprocket-wheel 8, driving a chain 9, which passes over the sprocket-pinion 9' on the shaft $j$. The pinion 11, also on shaft $a$, drives a sprocket-chain 12, which runs over an idler 13 on a stud-shaft 14, carried by an arm 15, hung upon the carrier-shaft P. This chain 12 sags against the sprocket-wheel 16, secured to said shaft P, and thus drives the carrier. A pinion 17, also on the shaft P, drives the sprocket-chain 18, which passes over a sprocket-gear 19, mounted on the finger-shaft $x$. Thus the several parts of our machine are operated. This system is one of several others that might be adopted for this purpose.

Having thus fully described our invention, what we claim as new, and desire to secure by Letters Patent, is—

1. In a feeder and band-cutter, the combination with a revoluble cutter proper having spaced plates, of a series of cleaning or raking hooks, there being a hook between each two plates, a deflector to which said hooks are attached, depending combs also connected to said deflector at the rear of said hooks, and means to vibrate or oscillate said deflector and its hooks and combs, and thereby cause the hooks to act against the straw which is clinging to the cutter and remove said straw, and the combs feed said straw toward the threshing-cylinder, all substantially as shown and described.

2. In a feeder and band-cutter, a cutter proper composed of plates having corners, one set of plates having their corners in a line intermediate the corners of the other set, and double-edged knives secured one to each corner of the respective plates, the edges of the plates forming continuations of the cutting edges of the knives.

3. In a feeder and band-cutter, a cutter proper composed of a shaft, a cylinder, a series of spaced plates with rectangular corners arranged as described, and a knife carried by the corners of the respective plates.

4. In a feeder and band-cutter, the combination with an endless carrier, a revoluble cutter, oscillating or vibrating clearing-hooks, an oscillating deflector with inclined combs, and a vibrating bottom adapted to receive the straw from the carrier and cutter and to support and advance the straw acted upon by the hooks and combs, and means to operate said several parts.

5. In a feeder and band-cutter, the combination with an endless carrier having transverse slats, of a sprocket-chain having seats to receive said slats, a clip adapted to conform to the shape of said slats, and extending around the forward edge of said slats, and a rivet or bolt adapted to extend through said clip, as described, and through its seat in the sprocket-chain, substantially as shown and described.

In testimony whereof we affix our signatures in presence of two witnesses.

EDWARD HUBER.
JACOB W. MILLER.

Witnesses:
JOHN J. CRAWLEY,
A. N. WOODRUFF.